(12) United States Patent
Durif

(10) Patent No.: US 7,987,932 B2
(45) Date of Patent: Aug. 2, 2011

(54) HEAVY VEHICLE

(75) Inventor: Pierre Durif, Enval (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 0 days.

(21) Appl. No.: 11/333,815

(22) Filed: Jan. 17, 2006

(65) Prior Publication Data

US 2006/0113126 A1  Jun. 1, 2006

Related U.S. Application Data

(63) Continuation of application No. PCT/EP2004/007663, filed on Jul. 12, 2004.

(30) Foreign Application Priority Data

Jul. 17, 2003  (FR) ...................... 03 08751

(51) Int. Cl.
  *B62D 61/10* (2006.01)
(52) U.S. Cl. .................... 180/22; 180/24.06; 180/24.08; 180/320; 180/376; 180/900
(58) Field of Classification Search ................ 180/22, 180/24.06, 24.08, 900, 905; 152/320, 376
  See application file for complete search history.

(56) References Cited

U.S. PATENT DOCUMENTS

| | | | | |
|---|---|---|---|---|
| 2,416,862 A * | 3/1947 | Baker | ............................ | 301/13.1 |
| 2,741,489 A * | 4/1956 | Bigge | ............................ | 280/426 |
| 3,319,545 A * | 5/1967 | Seaman et al. | ................. | 404/125 |
| 4,202,454 A * | 5/1980 | Browne et al. | .................. | 213/86 |
| 4,282,952 A * | 8/1981 | Bartley | ........................ | 188/18 A |
| 4,359,116 A * | 11/1982 | Mankey | ........................ | 180/6.48 |
| 4,458,772 A * | 7/1984 | Oswald et al. | ................. | 180/6.2 |
| 4,752,800 A * | 6/1988 | Matui | ............................... | 399/1 |
| 4,948,167 A * | 8/1990 | Kopczynski | ................ | 180/24.09 |
| 5,289,905 A * | 3/1994 | Braschler | ....................... | 188/296 |
| 5,906,418 A * | 5/1999 | Cullen | ........................ | 301/36.1 |
| 6,105,707 A * | 8/2000 | Tamura et al. | ................ | 180/307 |
| 6,247,233 B1* | 6/2001 | Hinton et al. | ................ | 29/894.3 |
| 6,640,857 B2* | 11/2003 | Ikeda | ............................ | 152/158 |
| 2002/0046794 A1 | 4/2002 | Durif | | |

FOREIGN PATENT DOCUMENTS

| | | |
|---|---|---|
| DE | 26 37 149 A | 2/1978 |
| DE | 38 11 398 A1 | 10/1989 |
| EP | 1 122 093 A | 11/1994 |
| FR | 2 317 153 A | 2/1977 |
| NL | 9 300 729 A | 11/1994 |
| WO | WO 00/71365 | 11/2000 |
| WO | WO 00/71365 A1 | 11/2000 |

OTHER PUBLICATIONS

Liebherr Mining Equipment Co. (Press Release Oct. 16, 1998, Liebherr T282 Design and Development).* "Caterpillar 797B Mining Truck Specifications", Dec. 2003, pp. 1-19.
"Fleets That Try One Don'T Go Back To Duals"; x One® Go Wide Save Greet, Brochure, Michelin North America, Inc. Jul. 2008.

* cited by examiner

*Primary Examiner* — Toan C To
(74) *Attorney, Agent, or Firm* — Cohen Pontani Lieberman & Pavane LLP

(57) ABSTRACT

A heavy vehicle, such as a transport vehicle or a "civil engineering" vehicle, of a mass greater than 500 metric tons, fitted with tires of radial structure of a diameter greater than three meters fifty having an axial width greater than 37 inches, and comprising a front axle provided with at least two tires and a rear axle, by which is transmitted at least part of the motive power. The rear axle of the vehicle comprises at least five tires.

8 Claims, 2 Drawing Sheets

HEAVY VEHICLE

CROSS-REFERENCE TO RELATED APPLICATIONS

This application is a U.S. Continuation Application of International Application PCT/EP2004/007663 filed on Jul. 12, 2004.

BACKGROUND OF THE INVENTION

1. Field of the Invention

The invention relates to a heavy vehicle such as a transport vehicle or a "civil engineering" vehicle, of a mass greater than 500 metric tons and fitted with tires of a diameter greater than three meters fifty having an axial width greater than 37 inches.

2. Description of the Related Art

Such vehicles, generally designed for carrying heavy loads, comprise a front steering axle comprising two steering wheels and a rear axle, which is most frequently rigid, comprising four driving wheels distributed in pairs on each side.

An axle is defined as an assembly of the elements enabling the fixed structure of the vehicle to be connected to the ground.

The axial or transverse direction of the tire is parallel to the axis of rotation of the tire.

The circumferential direction of the tire, or longitudinal direction, is the direction corresponding to the periphery of the tire and defined by the rolling direction of the tire.

The axis of rotation of the tire is the axis around which it turns in normal use.

In the case of vehicles, in particular intended for use in mines or quarries for transporting loads, the problems of access and demands of production lead the manufacturers of these vehicles to increase their loading capacity. It follows that the vehicles become ever larger and thus ever heavier in themselves and are capable of transporting an ever greater load. The current masses of these vehicles may reach several hundred metric tons, the same being true of the load to be transported; the total mass may reach 600 metric tons.

Since the loading capacity of the vehicle is directly linked to that of the tires, it is known that, to increase this loading capacity, it is necessary to increase the amount of air contained in the tires.

At present, as stated above, vehicles of this type, such as dumpers used in mines, comprise a rear axle on which are mounted four wheels, arranged in pairs, to respond to these demands.

Furthermore, the dimensions of said wheels and consequently those of the tires and in particular the rigidity of the lower zones require said wheels to be made in several parts to allow mounting of the tire on a rim. The operations involved in mounting and demounting said tires in the event of replacement or maintenance are long and tedious. The number of clamping parts which have to be handled during these operations may be greater than 200, and very high levels of clamping torque are associated therewith. The time taken for these operations is consequently long and therefore detrimental to the productivity sought during exploitation of said mines.

Since current demands tend towards a constant increase in the loading capacity of these vehicles, the various parameters listed above have resulted in widening of the tires so as to increase the volume of air therein. At around 4 meters, tire diameter is now such that it is virtually impossible to increase it further, in particular for reasons of transportation of said tires. In fact, the dimensions of said tires will be limited by transportation thereof, in particular by road widths and bridge headroom. It is likewise virtually impossible to decrease the rim diameter, which in particular allows positioning of the driving torque transmission system and of the braking systems.

During their studies, the inventors have succeeded in demonstrating that these "widened" tires do effectively allow an increase in transported load but exhibit various drawbacks. Tests have in fact shown that the endurance of these tires is reduced with respect to that of current tires and furthermore that they have lower resistance to wear.

Furthermore, patent application WO 00/71365 describes a method making it possible to simplify tire mounting, the latter being mounted directly on the hub, which serves as the rim. Independent rings then act as rim seats and are held in place by locking rings, which are connected firmly to the hub as a result in particular of being complementary in profile.

SUMMARY OF THE INVENTION

The inventors thus set themselves the task of responding to a new demand from users, who wish to see a further increase in the loading capacity of load-carrying vehicles, in particular those used in mines, the properties of the tires in terms of performance and wear remaining unimpaired with respect to those of current tires.

This aim is achieved according to the invention by a heavy vehicle, such as a transport vehicle or a "civil engineering" vehicle, of a mass greater than 500 metric tons, fitted with tires of a diameter greater than three meters fifty having an axial width greater than 37 inches, and comprising a front axle provided with at least two tires and a rear axle, by which is transmitted at least part of the motive power, said rear axle comprising at least five tires.

According to one advantageous embodiment of the invention, the rear axle comprises at least six tires, for example combined together in threes on either side of the rear axle in a conventional configuration.

Such a vehicle embodiment makes it possible to increase the loading capacity of this type of vehicle while retaining satisfactory endurance and wear properties which are not downgraded with regard to the current situation. The inventors have been able to demonstrate that the complexity of such a structure, according to which three tires are combined together and which therefore necessitates more complex mounting operations than in the case of two twin tires, is less detrimental in terms of productivity than a solution such as mentioned above, resulting in widening of the tires to allow an increase in loading capacity. In fact, studies show that the gains in endurance and wear, for an equivalent loading capacity, compensate for the increase in the time necessary for mounting and demounting of the tires, including occasional replacement due to accidental damage.

Another parameter which has to be taken into account in the design of such a vehicle is its bulk and more specifically its width. In fact, this type of vehicle is, for example, intended for use in mines, where it has to follow tracks formed in the mountainside which are in most cases of a width which is limited because they were cut to optimum size, a procedure which in itself consequently requires transportation of earth and rocks. The inventors have also been able to demonstrate that the addition of a third tire on each side of the axle does not cause unacceptable bulk, since, by definition, the width of all the tires together is reduced. It would seem in fact that, for the loads in question, the widthwise bulk of a vehicle according to the invention is less than that of a vehicle equipped with twin tires, despite the presence of gaps between additional tires. It should additionally be noted that vehicles of the dumper type, whose function is to carry large loads in a dump body positioned over the chassis, comprises at the level of said chassis suspension elements whose axial bulk is determined by loading capacity and which have a direct effect on the axial bulk of the vehicle at the level of the axle. These suspension elements, whose function is in particular to act as an anti-roll structure, actually exhibit an axial bulk which is so determined in particular as to withstand the roll forces which arise in particular on a bend as a result of the load being transported.

According to one variant embodiment of the invention, under nominal loading conditions, tire deflection in the zone of contact with the ground is less than 30%. Greater deflection and thus deformation of the tire reduce the radial and circumferential rigidity of the tire and contribute to poor wear resistance and affect the endurance of the tire.

Likewise preferably, the aspect ratio of the tires is greater than 0.80, and preferably greater than 1. Such aspect ratios make it possible in particular to limit the axial bulk of the tires on the axle.

As stated above, the vehicle according to the invention is more efficient in terms of productivity under a given load than is a vehicle as previously described which comprises twin tires. It is clear, moreover, that the use of six tires on the rear axle is not favorable to efficiency when it is necessary to replace a tire, if they are mounted on independent wheels. In fact, in particular when it is necessary to change a tire located axially to the inside with regard to the other two, it is necessary to remove the first two wheels in order to gain access to the third before engaging in the replacement procedure; this therefore involves a large number of operations.

The invention thus proposes advantageously to combine the vehicle as defined above with wheel-less mounting on the rear axle, the tires being set in place on the hub provided to this end through the intermediary of first mounting rings forming the tire bead seats and second locking rings ensuring positioning of said first rings and therefore of the tires. Mounting of this type has already been described in the above-cited patent application WO 00/71365. According to this embodiment, the invention requires that two recesses be provided on the hub to accommodate the locking rings, positioning of two of these rings being necessary per tire.

According to an advantageous embodiment of the invention, the rear axle comprises at most four tires transmitting the motive power. According to this embodiment, at least two tires and preferably the two axially outer tires on the rear axle do not advantageously transmit the motive power and have as their only essential function that of bearing part of the load. Such an embodiment makes it possible to reduce the longitudinal stresses arising in particular when the vehicle follows the course of a bend. In fact, when a vehicle comprising at least twin tires follows the course of a bend, the tires which are axially furthest to the outside cover a greater distance if positioned on the outside of the bend and a smaller distance if positioned on the inside of the bend.

The invention exhibits the particular advantage, with regard to the systems mentioned above which consist in widening the tires to carry the same load, of allowing a greater reduction in these longitudinal stresses borne by the mutually combined tires; in fact, in the case of wider twin tires, such longitudinal stresses remain greater because they arise to a greater degree between the sidewalls of one and the same tire.

According to an advantageous variant of the invention, the rear axle comprises at most two tires transmitting the motive power and consequently comprises four tires whose essential function is to bear part of the load. According to the latter variant embodiment in particular, the invention also provides for the tires of the front axle advantageously to transmit part of the motive power.

In a variant embodiment, the invention also provides for the front axle to comprise four tires, at least two tires of said front axle transmitting part of the motive power, as stated above. Preferably, the two axially inner tires are preferably the tires transmitting the motive power.

According to such an embodiment, the invention additionally advantageously provides, as described above in the case of the rear axle, for the tires to be mounted in wheel-less manner, said tires being set in place on the axle provided to this end through the intermediary of first mounting rings forming the tire bead seats and second locking rings ensuring positioning of said first rings and therefore of the tires, according to a method such as that described in patent application WO 00/71365 cited above. According to this embodiment, the invention requires that four recesses be provided on either side to accommodate the locking rings, it being necessary to position two of these rings necessary per tire.

Another variant embodiment of the invention provides for at least two tires, preferably the tires of the rear axle axially to the outside, not to transmit the motive power solely when the vehicle is following a trajectory which is not rectilinear, or preferably when it is following a bend whose radius of curvature is less than a predetermined value. Such an embodiment may be achieved by a decoupling device between said tires and the members transmitting the motive power. Such a device may be controlled by the vehicle's steering members according to any means known to the person skilled in the art.

In the same manner, the invention advantageously provides for the variant in which at least two tires of the front axle transmit part of the motive power to take effect only when the vehicle is following a trajectory which is not rectilinear, or preferably when it is following a bend whose radius of curvature is less than a predetermined value.

According to other variant embodiments of the invention, when all the tires on one and the same axle transmit at least part of the motive power, the axle is equipped with one or more devices allowing different speeds of rotation to be imparted to the different tires, said speeds being adapted in particular to limit the wear of the various tires, in particular when taking bends.

Such a variant embodiment provides, for example, for the tires of the rear axle all to participate in transmission of the motive power through the intermediary of devices, such as differential gears, which control the involvement of each of the tires as a function of the travel conditions of the vehicle.

The invention also provides for a vehicle such as described above, each of whose tires is associated with an electric motor, for example incorporated in the wheel associated with the tire or in the axle hub in the vicinity of a tire in the case, for example, of an embodiment according to the method described in document WO 00/71365 described above.

According to this latter embodiment, it is possible in particular for the rear axle to be provided with an odd number of tires, in particular greater than five, the tires advantageously been distributed symmetrically on the axle relative to a central tire.

Such an embodiment of the vehicle may also apply to the front axle, which may then in the same manner comprise three tires.

According to these various possible embodiments, the use of electric motors associated with a tire makes it possible to distribute the motive power variably as a function of the tires and of the trajectory followed.

In the same manner, the invention also provides for some only of the tires transmitting the motive power to be controlled by electric motors; these tires may for example be the tires of the front axle, those of the rear axle retaining conventional motorization and transmission.

When the motive power is due only to the electric motors, the invention also provides for certain ones only of the tires to be associated with such electric motors and for the other tires to have only load-bearing as their essential function.

Whatever the embodiment of the invention, it is always advantageously provided for all the tires to remain individually associated with a braking device, so as to be able to slow down or stop this type of vehicle under the best conditions.

BRIEF DESCRIPTION OF THE DRAWINGS

Other advantageous details and features of the invention will become clear below from the description of examples of embodiment of the invention made with reference to FIGS. 1 and 2, in which.

DETAILED DESCRIPTION OF THE PREFERRED EMBODIMENTS

Figure 1:
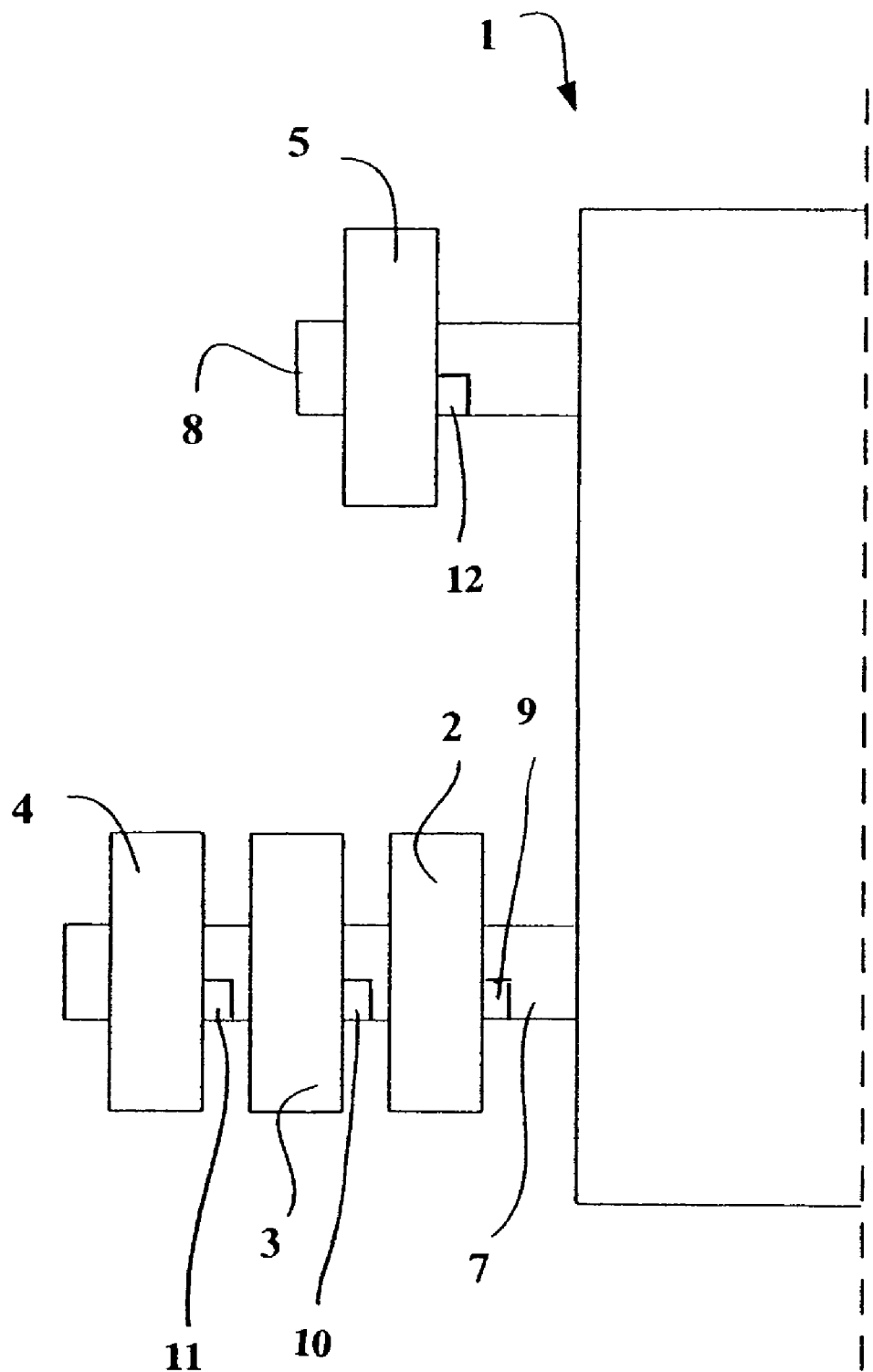
FIG. 1 shows a diagram, viewed from above, of a vehicle according to the invention.
Figure 2:
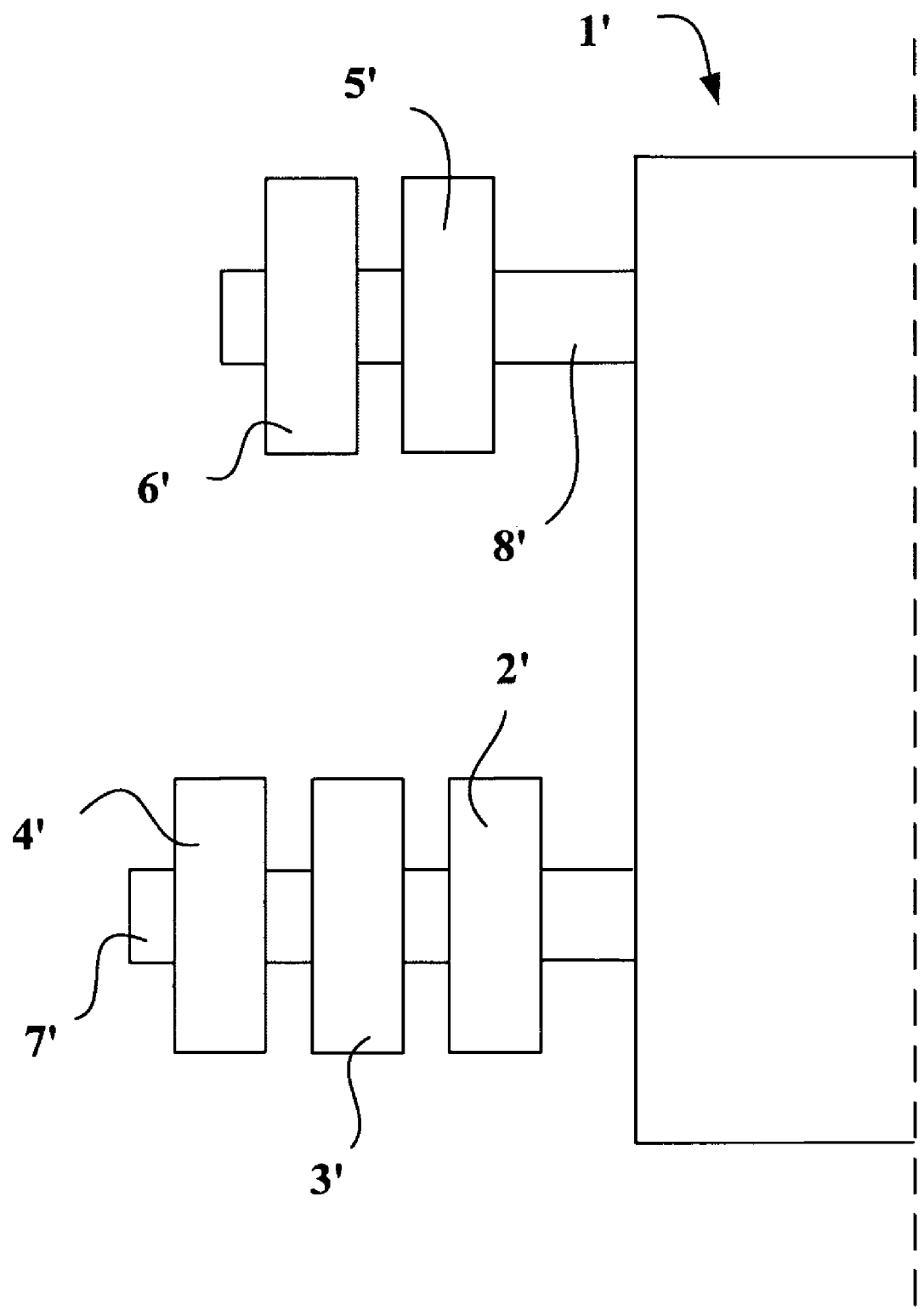
FIG. 2 shows a diagram, viewed from above, of a vehicle according to a second embodiment of the invention.

To simplify understanding thereof, FIGS. 1 and 2 are not to scale. FIGS. 1 and 2 show only half of the vehicles, which extend symmetrically relative to the axis XX', which represents the longitudinal median plane of the vehicle.

FIG. 1 is a diagrammatic representation of a half-vehicle 1 embodied in accordance with the invention and comprising six tires on the rear axle and two steering tires on the front axle. Since FIG. 1 shows only half of the vehicle, only three tires 2, 3, 4 are shown on the rear axle 7 and one tire 5 on the front axle 8.

The vehicle 1 shown diagrammatically in this FIG. 1 is a heavy vehicle having a total loaded weight of the order of 850 metric tons.

The tires with which the vehicle is fitted are large tires whose aspect ratio H/S is equal to 1, H being the height of the tire on the rim and S the maximum axial width of the tire when the latter is mounted on its service rim and inflated to its recommended pressure. The tires are of dimension 44R69.

These tires comprise a radial carcass reinforcement composed of inextensible metal cables of steel, oriented radially and anchored in each tire bead.

The tires of the rear axle 7 are mounted using the method described in patent application WO 00/71365. According to this method, the hub 7 of the vehicle is designed to receive the tires through the intermediary of rings having a surface forming the tire bead receiving seat. The surface of these rings is advantageously frustoconical in shape. The receiving rings are themselves locked on the hub of the axle through the intermediary of locking rings, one part of whose surface is complementary in shape to that of recesses provided on said hub and in which said locking rings are inserted.

The vehicle thus embodied would allow a loading capacity greater than that of current vehicles, of the order of 850 metric tons. The design of a vehicle of the same type, that is to say intended for the same loading capacity, equipped with four tires arranged in pairs on the rear axle could result in the use of tires of dimensions 85/65R69. Since this type of vehicle does not exist, it was impossible to carry out tests; however calculations and simulations provide simple ways in which the person skilled in the art may acquire information about the loads transportable by said vehicles, the dimensions thereof as well as the stresses imposed on the tires and consequently an estimate of the wear and fatigue which they withstand.

Measurements of overall dimensions have thus been determined on the basis of these two vehicles; the results obtained show that the vehicle according to the invention exhibits an axial width, measured in the direction of the rear axle 7, of 10.20 meters. The axial width, measured in the same manner for the vehicle comprising four tires arranged in pairs is 12.1 meters. These values clearly show an increase with regard to the width of the vehicle.

Furthermore, simulations were performed to show the service lives of an axle carrying six 44R69 tires on a vehicle according to the invention and an axle carrying four tires mounted in pairs of the type 85/65R69.

The results obtained are shown below:

On a basis of 100, corresponding to 5000 hours of use, the results show that the tires on a vehicle according to the invention have an average service life equivalent to 115 when the six tires of the rear axle are driving tires, whereas the tires fitted to a similar vehicle according to a conventional configuration, that is to say with four tires on the rear axle, have an average service life equivalent to 90.

It would appear that the results obtained according to the invention are distinctly better.

Tests were performed to demonstrate that these results could not be expected by or at the very least be obvious to the person skilled in the art. The same was done for lower load vehicles, in particular those with an overall load of 90 metric tons. In a configuration comprising six tires, it was determined that tires of dimension 1800R33 are used and, for a configuration with four twin tires, tires of dimension 30/70R33 are used.

The results obtained relating to the overall size of the vehicle are as follows:

The three tires of dimension 1800R33 mounted on said vehicle result in an overall size in the axial direction of 1.990 meters.

The three tires of dimension 30/70R33 mounted on the same vehicle result in an overall size in the axial direction of 1.850 meters.

The results given above show that for this type of vehicle, a solution with six tires on the rear axle is less worthwhile in terms of bulk and therefore no doubt in terms of service life, since the axially outer tires of the rear axle, in a six tire configuration, will be extremely highly stressed and thus subject to greater wear. It is clear from these results that the information acquired with regard to vehicles of a lower loading capacity would not lead one to expect the advantages achieved by the invention.

The invention also provides as stated above, for the tire 4 to have load-bearing as its sole essential function and not to be involved in the transmission of motive power. Such an embodiment consists in fixing the tire on a system of the free wheeling type, which allows free rotation of said tire 4. When the vehicle follows a curved course, in particular on bends with a small radius of curvature, this embodiment allows it to follow its course without suffering from supplementary stresses due solely to its position on the axle, which causes it to follow a longer or shorter trajectory than tires 2 and 3. In another embodiment, for the same reasons the invention also provides for only the tire 2 to transmit the motive power at the level of the rear axle 7.

According to this latter embodiment, the invention may provide for the tire 5 mounted on the front axle 8 also to participate in transmission of the motive power. Furthermore, the fact that the tire 5 transmits part of the motive power may improve handling of the vehicle on curved trajectories. In fact, motive power transmitted partially by the tires of the front axle 8 may facilitate following of the trajectory when these same tires are turned, in particular when the vehicle is loaded. It would appear, in fact, that under certain loading and travel conditions, handling of such a vehicle, over a curved trajectory, equipped with six tires on the rear axle 7 transmitting the motive power, is very difficult or indeed impossible, since the vehicle does not respond to the turning imposed by the tires of the front axle. These conditions may furthermore result in splitting and destruction of the tires of the front axle.

Another variant of the invention provides for all the tires 2, 3, 4 and 5 to be involved in transmission of the motive power, said tires 2, 3, 4 and 5 being controlled individually by electric motors 9, 10, 11 and 12, respectively, which are supported by the rear axle 7 and disposed in the vicinity of the respective tires 2, 3, 4 and 5. Such an embodiment makes it possible to transmit variable proportions of motive power through the intermediary of various tires fitted on the vehicle as a function of the trajectory followed and the load state of said vehicle.

FIG. 2 illustrates another embodiment of a vehicle 1' according to the invention, which differs from the previous embodiment by the presence of a supplementary tire 6' mounted on the front axle 8', which is therefore a steering tire. The addition of this tire 6' makes it possible to distribute the load over more tires. Such an embodiment makes it possible, for example, to increase still further the loading capacity or alternatively to permit a reduction in the dimension of the tires. Such a configuration according to the invention may lead in particular to a loading capacity greater than 1000 metric tons.

An embodiment according to FIG. 2 also makes it possible to improve handling of the vehicle under conditions such as those mentioned above which are liable to result in splitting of the steering tires of the front axle 8'. In fact, the increase in number of tires makes it possible better to resist the stresses resulting in splitting and thus to succeed in imposing the change in direction.

In such an embodiment of a vehicle 1', the tire 6' may have the sole function of bearing part of the load. According to other variant embodiments, the tire 6' may participate in transmission of motive power either permanently or temporarily, as mentioned above, or alternatively variably, for example by using electric motors.

The invention claimed is:

1. A heavy load-carrying vehicle of a mass greater than 500 metric tons and operable to generate a motive power, the heavy load-carrying vehicle comprising:
   a front axle;
   at least two front tires mounted on the front axle;
   a rear axle for transmitting at least part of the motive power, the rear axle being spaced from the front axle; and
   at least five rear tires mounted on the rear axle,
   wherein each of the front and rear tires has a diameter greater than 3.5 meters and an axial width greater than 37 inches; and
   wherein four front tires are mounted on the front axle, two of which are driving or motive power transmitting tires.

2. The heavy load-carrying vehicle of claim 1, wherein at least six rear tires are mounted on the rear axle.

3. The heavy load-carrying vehicle of claim 1, wherein, under pre-determined loading and pressure conditions and on a flat ground, tire deflection of each of the front and rear tires in a zone of contact with the flat ground is less than 30%.

4. The heavy load-carrying vehicle of claim 1, wherein an aspect ratio of each of the front and rear tires is greater than 0.80.

5. The heavy load-carrying vehicle of claim 1, wherein at most four of the at least five rear tires are driving or motive power transmitting tires.

6. The heavy load-carrying vehicle of claim 1, wherein each of the driving tires is controlled by an electric motor.

7. The heavy load-carrying vehicle of claim 1, wherein the load carrying vehicle is a dumper vehicle.

8. The heavy load-carrying vehicle of claim 4, wherein the aspect ratio of each of the front and rear tires is greater than 1.

* * * * *